United States Patent [19]
Vandenberg et al.

[11] Patent Number: 5,155,544
[45] Date of Patent: Oct. 13, 1992

[54] FOUCAULT METHOD FOR TESTING AN OPTICAL SURFACE

[75] Inventors: Donald E. Vandenberg, Brockport; Thomas W. Dey, Springwater; William D. Humbel; John G. Pitek, both of Rochester, all of N.Y.

[73] Assignee: Eastman Kodak Company, Rochester, N.Y.

[21] Appl. No.: 464,278

[22] Filed: Jan. 12, 1990

[51] Int. Cl.⁵ .............................................. G01B 9/00
[52] U.S. Cl. ................................... 356/124; 359/227
[58] Field of Search ............... 356/124, 125, 126, 127, 356/129; 350/266

[56] References Cited
U.S. PATENT DOCUMENTS
4,812,039 3/1989 Shimada et al. .................... 356/129

FOREIGN PATENT DOCUMENTS
139043 8/1983 Japan ................................... 356/125

Primary Examiner—F. L. Evans
Attorney, Agent, or Firm—Stephen C. Kaufman

[57] ABSTRACT

The Foucault or knife-edge method may be employed for testing an optical surface defined by an imaging device, for example, a mirror surface, to ascertain its characteristics, for example, whether or not it is a source of optical aberrations. To this end, the traditional Foucault knife-edge method typically employs a knife-edge that comprises a metal razor blade. The present method, in contrast, provides an improved Foucault method, and features a novel optical element suitable for employment in the method. The optical element comprises a transparent substrate, and a coating material that can adhere to at least a portion of the transparent substrate, thereby forming at least one knife-edge pattern.

20 Claims, 2 Drawing Sheets

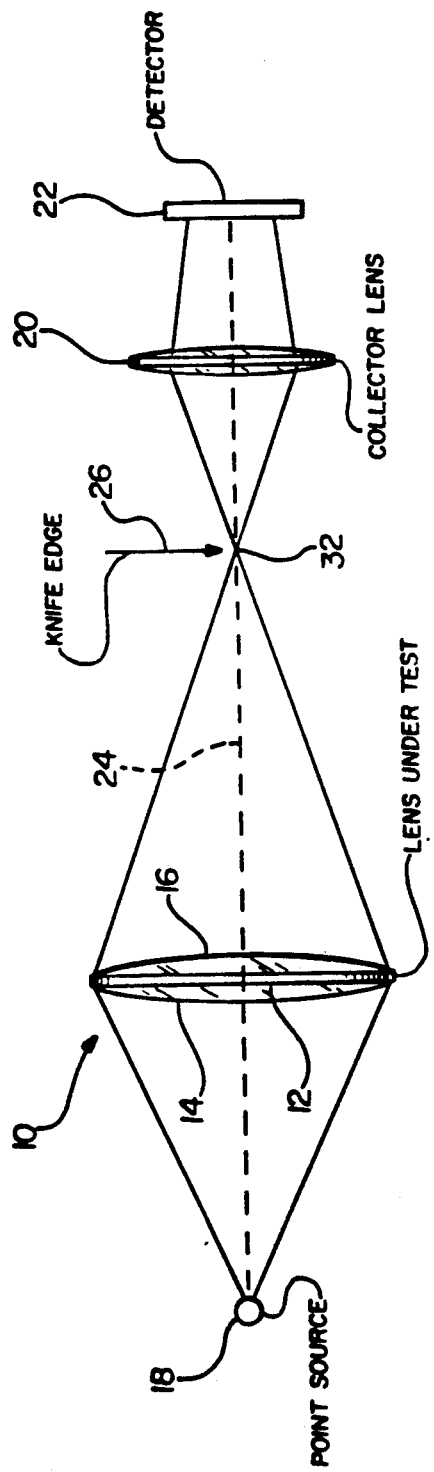
FIG. IA
(PRIOR ART)
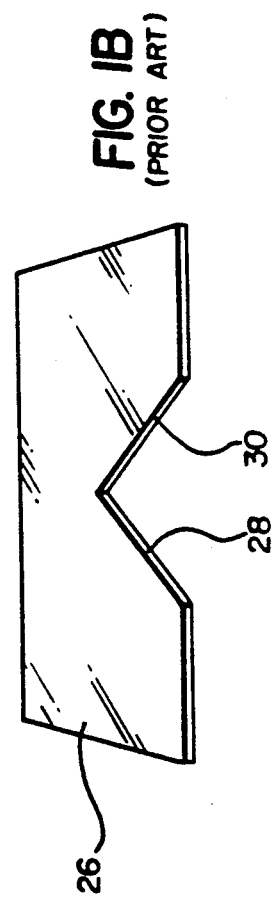
FIG. IB
(PRIOR ART)

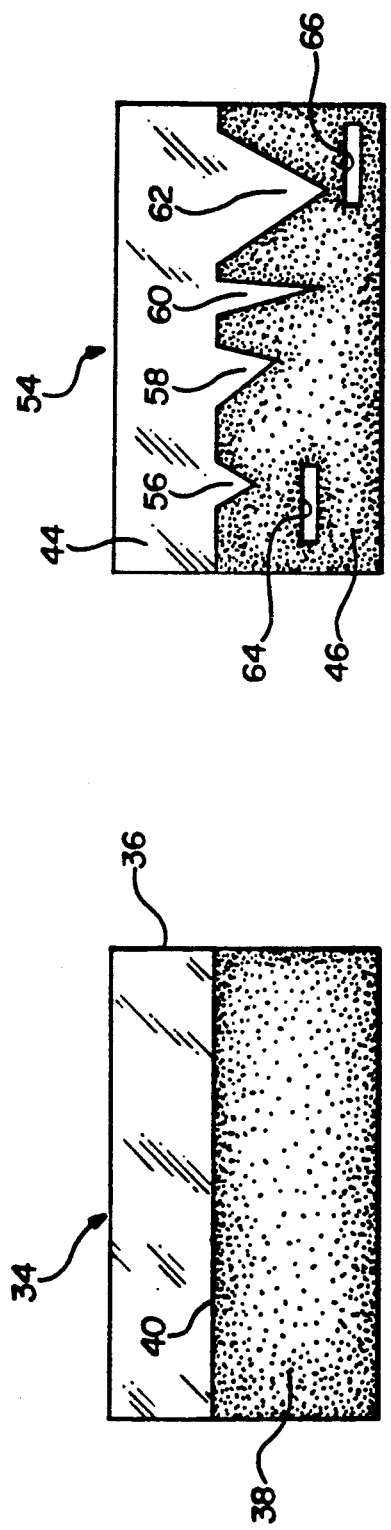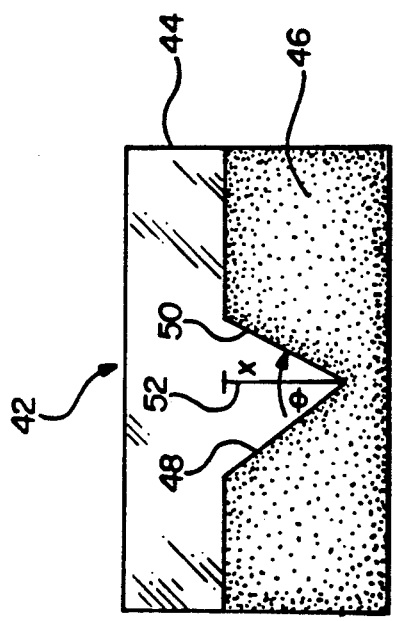

FOUCAULT METHOD FOR TESTING AN OPTICAL SURFACE

CROSS REFERENCE TO A RELATED APPLICATION

This application is related to a copending and commonly assigned patent application Ser. No. 07/464,042 filed Jan. 12, 1990 to Pitek et al., which is being filed contemporaneously with this application. The entire disclosure of this copending application is incorporated by reference herein.

BACKGROUND OF THE INVENTION

This invention relates to a method for testing an optical surface, the optical surface defined by an imaging device, and in particular to a knife-edge method introduced by J. Foucault, in 1858.

INTRODUCTION TO THE INVENTION

The Foucault or knife-edge method is a well-known and fundamental method for testing, for example, an optical surface defined by an imaging device, the imaging device comprising, for example, a lens, a mirror or a diffraction grating. The method may be usefully employed for determining that all the zones of a supposedly spherical optical surface, have the same radius of curvature.

Attention is directed to FIGS. 1A, B, which show a typical optical assembly 10 for demonstrating the basic principles of the knife-edge method. The assembly 10 includes a conventional lens 12, the lens 12 comprising a pair of optical surfaces 14, 16, a point light source 18, a collector lens 20, and a photodetector 22. The components of the assembly 10 are positioned normal to an optical axis 24.

For this optical assembly 10, one may employ the knife-edge test for detecting (at the photodetector 22) the presence of transverse aberrations that may have been introduced into the assembly 10 by the lens optical surfaces 14, 16. Accordingly, a metal knife-edge 26 (as shown in detail in FIG. 1B) comprising two straight, in plane orthogonal edges 28, 30, may be gradually introduced into the assembly 10, so that the knife-edge 26 sequentially cuts and blocks the light source 18 at a plane of convergence 32. This action, in turn, removes light source rays from their expected trajectories, so that a variable knife-edge intensity pattern may be registered at the photodetector 22. Finally, a comparison of the knife-edge intensity pattern with a theoretical intensity pattern for an ideal optical surface, becomes a measure of the presence of transverse aberrations introduced by the optical surfaces 14, 16.

SUMMARY OF THE INVENTION

The technical literature on the knife-edge method introduced by Foucault is extensive. For example, reference may be made (and is incorporated by reference herein) to "Optical Shop Testing" by Daniel Malacara, John Wiley and Sons, New York, 1978, pages 231-253, and "Modern Optics" by Earle Brown, Reinholt Publishing Corporation, New York, 1966, pages 448-451.

The technical literature on the knife-edge method is extensive, because it is perhaps the classic optical test for objectives, or imaging devices. At the same time, however, the instruction and teaching provided by the literature has remained virtually unchanged since its original promulgation, in 1858. Hence, for example, Malacara's text provides diagrams of the Foucault apparatus (FIGS. 8.9 and 8.10, pages 236, 237) which diagrams clearly demonstrate that the knife-edge is a conventional metal razor blade. Moreover, the "Modern Optics" text asserts (as late as 1965) that "a discarded razor blade makes an excellent knife edge" (page 448, supra).

We have discovered, in sharp contrast to the extant literature, that a knife-edge which comprises a conventional metal razor blade, especially including a "discarded" razor blade, may not be entirely satisfactory for our purposes. And these purposes are where one attempts to use the Foucault method to realize accuracies and sensitivities of measurement, not heretofore required. For example, the accuracy of focal length measurements provided by the conventional razor blade Foucault method, is typically on the order 0.25 mm. It is true that with complicated and expensive apparatus, somewhat higher accuracies can be achieved. Nevertheless, we have discovered that the employment of the conventional razor blade knife-edge may preclude one from readily and efficiently securing our desired accuracy and sensitivity goals, namely, for example, focal length measurements on the order of 0.025 mm, or measurements requiring an assembly wavefront quality tolerance less than 0.05 waves (where a wave is defined as a wavelength of light used for the Foucault test, typically 0.4 to 0.7 microns).

We have further determined a set of problems associated with the employment of the conventional metal razor blade, which problems may vitiate the goal of realizing the stated objectives of accuracy and sensitivity. These problems include, inter alia:

(1) The thickness of the metal razor blade may cause inaccuracies in the apparent transverse ray aberrations generated by an edge of the razor blade.
(2) The thickness problem may be compounded, when the razor blade comprises two independent plane orthogonal edges to cut the transverse rays, and the thickness of each of the two edges can be variable.
(3) Manufacturing techniques to obtain a desired precision razor blade may be thwarted:
  (a) by expense;
  (b) by the difficulties in removing various arbitrary crystalline grain boundaries, and dislocation structures;
  (c) by the inherent difficulties in sharpening the razor blade to a desired microscopic straight edge; and
  (d) by the difficulties in aligning and maintaining two co-planar edges. and
(4) The metal razor blade may be easily damaged, and presents, moreover, a certain degree of human risk, since it may be handled in a dark environment, and placed near the eye.

The present invention, in contrast to the prior art, provides a novel alternative to the employment of a conventional metal razor blade—an alternative that can preserve all the virtues of the Foucault method, yet realize the preferred method objectives of efficiency, low cost, precision measurement and safety.

The present invention, accordingly, comprises a method for measuring optical characteristics of an optical surface defined by an imaging device, the method comprising:

1) providing an optical assembly, the optical assembly comprising:
  a) an imaging device comprising an optical surface;

b) a source of radiation directed along a reference axis to the optical surface; and c) a detection means aligned on the reference axis for detecting the radiation imaged by the optical surface; and 2) introducing an optical element comprising a knife-edge into the assembly for gradually cutting the radiation imaged by the optical surface, thereby producing a variable radiation pattern for detection by the detection means, wherein, the optical element comprises:

a) a transparent substrate; and b) a coating material that can adhere to at least a portion of the transparent substrate, thereby forming at least one knife-edge pattern.

The present invention, as defined, has an advantage that it can eliminate all of the problems set forth above that may be associated with the employment of a conventional metal razor blade. Further, the coating material on the transparent substrate now becomes a measure of the thickness of the knife-edge required in the Foucault method, and the thickness of the coating material may be at least three orders of magnitude thinner than the conventional metal razor blade. This feature directly translates into an enhanced method sensitivity. At the same time, moreover, the enhanced method sensitivity of the present invention is not compromised by any loss in method robustness, because the transparent substrate, which resides behind the coating knife-edge, cannot itself add spurious aberrations to the imaging device. Other significant advantages of the present invention are discussed below.

BRIEF DESCRIPTION OF THE DRAWINGS

The invention is illustrated in the accompanying drawing, in which:

FIGS. 1A, B (prior art) assembly for using the Foucault knife-edge method; and

FIGS. 2A-C show alternative embodiments of an optical element constructed in accordance with the principles of the present invention.

DETAILED DESCRIPTION OF THE INVENTION

As summarized above, the novel optical element of the present invention comprises a transparent substrate, and a coating material that can adhere to at least a portion of the transparent substrate, thereby forming at least one knife-edge pattern. Details of the optical element are now set forth.

The transparent substrate of the present invention preferably has a high precision plano-shape, i.e., a flat-shaped configuration, e.g., flat to within one micron over the area which is coated by the coating material. The transparent substrate preferably comprises a conventional glass. It may, alternatively, comprise a conventional plastic, or an equivalent transparent material, and one that is substantially self-supporting. A suitable transparent substrate has an index of transmittance that distinguishes it from a metal, for example, a transmittance preferably greater than 10 percent. Restated, a suitable transparent substrate is one that is "transparent" vis-a-vis the source of radiation.

An advantage of the present invention is that the thickness of the transparent substrate may be variable, but, for example, for a glass substrate, is preferably from 0.5 mm to 5 mm. Further, the transparent substrate may have, for example, a circular, square or trapezoidal shape, but preferably defines a rectangular shape, the latter preferably having dimensions of approximately 3 to 50 mm length, by 3 to 50 mm width.

The coating material of the present invention preferably is such that, in combination with the transparent substrate and the source of radiation, at least one portion of an optical element may be defined that qualitatively differentiates a substantially opaque region from a substantially transparent region. Restated, the transmittance of the substantially opaque region in ratio to the transmittance of the substantially transparent region is preferably less than 10.0 percent. To this end, the coating material preferably comprises silver, or chrome, or aluminum, or conventional paints, or combinations of these coating materials.

A particularly preferred coating material comprises a conventional photo-emulsion. This material is preferred because (1) it provides a desired opacity for a typical employment of the Foucault method, (2) it inherently and readily adheres to a typical transparent substrate, for example, glass, and (3) it has a preferred coating thickness, typically less than 10 microns.

On this last point, thickness, the coating material preferably has a thickness less than 25.4 microns, especially less than 0.25 microns. As indicated above, control of the thickness of the coating material directly translates into the "sharpness" of the knife-edge, hence directly translating into an enhanced Foucault method sensitivity. Our discovery of suitable coating materials enables one to selectively, easily and economically, control the thickness of the knife-edge, as especially compared with the conventional metal razor blade.

A selected coating material can adhere to the transparent substrate either inherently, as in paints, or inherently by way of conventional adhesion processes including, for example, the conventional high vacuum evaporative processes, or sputtering processes, or chemical vapor deposition processes.

As summarized above, the coating material can adhere to at least a portion of the transparent substrate, thereby forming at least one knife-edge pattern. The pattern adhesion may be realized by way of conventional mask techniques, or lithographic film or plate techniques. A preferred technique employs conventional photographic techniques, for example, photolithographic films and plates.

Attention is now directed to FIGS. 2A-C, which show preferred optical elements of the present invention, and suitable for employment in the Foucault method.

FIG. 2A shows an optical element 34. The optical element 34 comprises a white crown glass substrate 36, and a coating material 38 comprising blue chrome. The transition from opacity to transparency is abrupt, that is, the transmittance of the opaque region in ratio to the transmittance of the transparent region, is 0.01 percent. The thickness of the coating material 38 is 500 angstroms. The knife-edge pattern is a substantially straight line 40.

For the FIG. 2A embodiment, operation of the steps of the Foucault method requires that the optical element 34 be passed two times through the reference axis 24 (see FIG. 1A), the second time orthogonal to the first time, in accordance with well-known procedures of the Foucault method. In short, this is because the optical element 34 only defines one knife-edge, namely, the straight line 40.

The FIG. 2B embodiment shows an optical element 42. The optical element 42 comprises a white crown glass substrate 44, and a coating material 46 comprising photoemulsion. The coating material 46 adheres to the glass substrate 44 by way of an evaporative process. The transition from opacity to transparency is abrupt, and the coating material is several microns thick.

The FIG. 2B knife-edge pattern defines a "V" configuration, having two independent knife edges 48, 50. The angle $\theta$ subtended by the FIG. 2B pattern is 90°. This is a preferred angle for employment of the Foucault method, since it simplifies an algorithm that may be used in the method, but it is emphasized that the angle $\theta$ can be any known angle, preferably a known angle from 45° to 135°. The distance $\chi$ measured along a line 52, and extending to an outer envelope of the "V", as shown, may be expressed by the equation (1):

$$X < 200\lambda F\# \qquad (1),$$

where $\lambda$ is the wavelength of the FIG. 1A point source 18, and F# is the image space F number (1/w) of the optical assembly. In the FIG. 2B optical element 42 embodiment, $\chi = 2.0$ mm.

Note that one selects a particular subtended angle $\theta$, and distance $\chi$, in accordance with a particular imaging device to be tested, and available point source. Hence, to accommodate the point source beam (shown dotted in FIG. 2B), the angle $\theta$ and distance $\chi$ are predetermined, so that the coating material may be applied to the substrate in correspondence to these derived parameters $(\theta, \chi)$. This coating procedure and pattern generation may be tailored to any immediate application of the Foucault method, and as the coating may be done efficiently and inexpensively, it emphasizes a key advantage of the present invention.

Attention, finally, is directed to FIG. 2C, which shows an optical element 54 comprising a set of four knife-edges (numerals 56, 58, 60, 62). The optical element 54 may be thought of as a "template", in the sense that any one of the knife-edges 56-62 (each manufactured like that of FIG. 2B, supra) may be readily and sequentially selected, for instantly accommodating an arbitrary point source beam, and without vignetting.

Note further in FIG. 2C, a pair of slits 64, 66 provided through the coating material, which slits 64, 66 can optimize alignment of the optical element 54 (via mechanical intermediaries, not shown) to the reference axis of the method assembly. It will be understood, finally, by those skilled in the art, that employment of the optical element 54 (as well as, for that matter, the optical element 42 in the FIG. 2B embodiment, supra) in the Foucault method, requires passing the optical element only once through the point source beam, since each of these optical elements (54 and 42) comprises two independent, orthogonal knife edges.

It is claimed:

1. In a Foucault knife-edge method for measuring transverse aberrations in the optical characteristics of an optical surface of a first radiation imaging device, comprising the steps of directing rays from a point source of radiation along a reference axis for convergence at a focal point on a plane of convergence, locating a photodetector in alignment with said axis beyond said focal point from said surface, imaging said surface onto said detector utilizing a second radiation imaging device located intermediate said focal point and said detector, and gradually introducing a knife-edge along said plane through said focal point to sequentially cut and block said rays from said source, so that a variable knife-edge intensity pattern is registered at said photodetector; the improvement wherein:

said method further comprises providing an optical element including a flat transparent substrate at least partially coated with an opaque material, said material defining a straight edge; and said knife-edge introducing step comprises introducing said straight edge on said substrate along said plane through said focal point.

2. An improvement as in claim 1, wherein said introducing step further comprises introducing said straight edge through said focal point two times, a first time along a first direction, and a second time along a direction orthogonal to said first direction.

3. An improvement as in claim 1, wherein said providing step further comprises said opaque material coating comprising two converging straight edges laid out in a "V"-shaped pattern.

4. An improvement as in claim 3, wherein said straight edges of said "V"-shaped pattern converge at an angle in the range of 45°-135°.

5. An improvement as in claim 4, wherein said angle is 90°.

6. An improvement as in claim 1, wherein said substrate has a high precision plano-shape.

7. An improvement as in claim 6, wherein said substrate is flat to within one micron.

8. An improvement as in claim 6, wherein the thickness of said substrate is 0.5 mm to 5 mm.

9. An improvement as in claim 8, wherein said opaque material coating has a thickness of less than 25.4 microns.

10. An improvement as in claim 9, wherein said coating ha a thickness of less than 10 microns.

11. An improvement as in claim 10, wherein said substrate is white crown glass and said coating is a blue chrome coating of 500 angstrom thickness.

12. An improvement as in claim 10, wherein said coating is a photoemulsion.

13. In a Foucault knife-edge method for measuring transverse aberrations in the optical characteristics of an optical surface of a first lens, comprising the steps of directing rays from a point source of light along an optical axis for convergence at a focal point on a plane of convergence, locating a photodetector in alignment with said axis beyond said focal point from said surface, imaging said surface onto said detector utilizing a second lens located intermediate said focal point and said detector, and gradually introducing a knife-edge along said plane through said focal point to sequentially cut and block said rays from said light source, so that a variable knife-edge intensity pattern is registered at said photodetector; the improvement wherein:

said method further comprises providing an optical element including a plano-shaped flat transparent substrate at least partially coated with a layer of opaque material, said layer defining a "V"-shaped pattern having two straight edges converging at an angle in the range of 45°-135°; and said knife-edge introducing step comprises introducing said straight edges on said substrate along said plane through said focal point, with said coating facing said optical surface and said substrate facing said detector.

14. An improvement as in claim 13, wherein said point source has a wavelength, and said "V"-shaped pattern is dimensioned to have a distance X from a point of convergence of said edges to an outer envelope of said "V"-shaped pattern defined by the equation $$X < 200\lambda F\#,$$

wherein λ is said wavelength, and F# is an image space number (1/w) of the optical assembly defined by said lenses, point source and detector.

15. An improvement as in claim 13, wherein in said providing step said layer of opaque material defines a template of a plurality of "V"-shaped knife-edge patterns, and said introducing step comprises introducing a selected one of said "V"-shaped patterns through said focal point.

16. An improvement as in claim 15, wherein optical alignment slits are provided through said layer of opaque material; and said method further comprises aligning said optical element relative to said axis using said optical alignment slits.

17. An improvement as in claim 13, wherein said introducing step comprises passing said optical element only once through said focal point.

18. A Foucault knife-edge method for measuring transverse aberrations in the optical characteristics of an optical surface of a first radiation imaging device, comprising the steps of:

directing rays from a point source of radiation along a reference axis for convergence at a focal point on a plane of convergence;

locating a photodetector in alignment with said axis beyond said focal point from said surface;

imaging said surface onto said detector utilizing a second radiation imaging device located intermediate said focal point and said detector; and gradually introducing a knife-edge along said plane through said focal point to sequentially cut and block said rays from said source, so that a variable knife-edge intensity pattern is registered at said photodetector; said knife-edge comprising a layer of opaque material coated over a flat transparent substrate to form a "V"-shaped pattern having two straight edges converging at an angle in the range of 45°–135°.

19. A method as in claim 18, wherein said point source has a wavelength, and said "V"-shaped pattern is dimensioned to have a distance X from a point o convergence of said edges to an outer envelope of said "V"-shaped pattern defined by the equation $$X < 200\lambda F\#,$$

wherein λ is said wavelength, and F# is an image space number (1/w) of the optical assembly defined by said imaging devices, point source and detector.

20. A method as in claim 19, wherein said layer of opaque material defines a template of a plurality of "V"-shaped knife-edge patterns, and said introducing step comprises introducing a selected one of said "V"-shaped patterns through said focal point.

* * * * *